United States Patent
Wakimoto

(10) Patent No.: US 12,244,039 B2
(45) Date of Patent: Mar. 4, 2025

(54) SECONDARY BATTERY AND ASSEMBLED BATTERY

(71) Applicant: PRIME PLANET ENERGY & SOLUTIONS, INC., Tokyo (JP)

(72) Inventor: Ryoichi Wakimoto, Kobe (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 25 days.

(21) Appl. No.: 17/536,456

(22) Filed: Nov. 29, 2021

(65) Prior Publication Data

US 2022/0181755 A1 Jun. 9, 2022

(30) Foreign Application Priority Data

Dec. 3, 2020 (JP) .................. 2020-200852

(51) Int. Cl.
| | |
|---|---|
| *H01M 50/566* | (2021.01) |
| *H01M 10/0587* | (2010.01) |
| *H01M 50/103* | (2021.01) |
| *H01M 50/502* | (2021.01) |
| *H01M 50/528* | (2021.01) |
| *H01M 50/553* | (2021.01) |

(52) U.S. Cl.
CPC ..... *H01M 50/566* (2021.01); *H01M 10/0587* (2013.01); *H01M 50/103* (2021.01); *H01M 50/502* (2021.01); *H01M 50/528* (2021.01); *H01M 50/553* (2021.01); *H01M 2220/20* (2013.01)

(58) Field of Classification Search
CPC .. H01M 50/553; H01M 50/15; H01M 50/176; H01M 50/103
See application file for complete search history.

(56) References Cited

U.S. PATENT DOCUMENTS

| | | | |
|---|---|---|---|
| 2014/0242440 A1* | 8/2014 | Yamada | H01M 50/176 429/121 |
| 2014/0377601 A1* | 12/2014 | Kim | H01M 50/528 429/61 |
| 2017/0250394 A1 | 8/2017 | Wakimoto et al. | |
| 2018/0034095 A1 | 2/2018 | Yoshida et al. | |

(Continued)

FOREIGN PATENT DOCUMENTS

| | | |
|---|---|---|
| CN | 107134559 A | 9/2017 |
| CN | 107665968 A | 2/2018 |

(Continued)

*Primary Examiner* — Matthew T Martin
*Assistant Examiner* — Grace Ann Kenlaw
(74) *Attorney, Agent, or Firm* — Finnegan, Henderson, Farabow, Garrett and Dunner LLP

(57) ABSTRACT

A secondary battery disclosed herein includes: an electrode body; a battery case; a terminal extracted from a terminal extracting hole to outside of the battery case; and an external conductive member joined to the terminal. The external conductive member has a through-hole into which a part of the terminal is inserted, and a joining portion between the external conductive member and the terminal is formed at a peripheral edge of the through-hole. The external conductive member has an approximately annular thin portion provided around the joining portion, and the thin portion is configured to melt when a current of 1000 A or more flows through the secondary battery.

11 Claims, 10 Drawing Sheets

(56) References Cited

U.S. PATENT DOCUMENTS

| | | | |
|---|---|---|---|
| 2018/0069200 A1* | 3/2018 | Ono | H01M 50/55 |
| 2019/0027717 A1 | 1/2019 | Chen et al. | |
| 2019/0103596 A1 | 4/2019 | Muroya et al. | |
| 2019/0140251 A1 | 5/2019 | Wakimoto et al. | |
| 2019/0198850 A1 | 6/2019 | Asakura et al. | |
| 2019/0273277 A1* | 9/2019 | Wakimoto | H01M 10/04 |
| 2020/0313144 A1 | 10/2020 | Wakimoto | |

FOREIGN PATENT DOCUMENTS

| | | |
|---|---|---|
| CN | 107808937 A | 3/2018 |
| CN | 109585770 A | 4/2019 |
| CN | 109768339 A | 5/2019 |
| CN | 110224105 A | 9/2019 |
| EP | 2 816 637 A1 | 12/2014 |
| JP | H 08315802 A | 11/1996 |
| JP | 2013-157109 A | 8/2013 |
| JP | 2016-192322 A | 11/2016 |
| JP | 2016-225065 A | 12/2016 |
| JP | 2017-157334 | 9/2017 |
| JP | 2018-041668 A | 3/2018 |
| JP | 2019-114501 A | 7/2019 |
| JP | 2019-153440 A | 9/2019 |
| JP | 2020-167010 A | 10/2020 |

\* cited by examiner

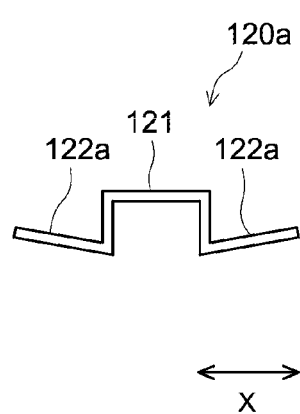
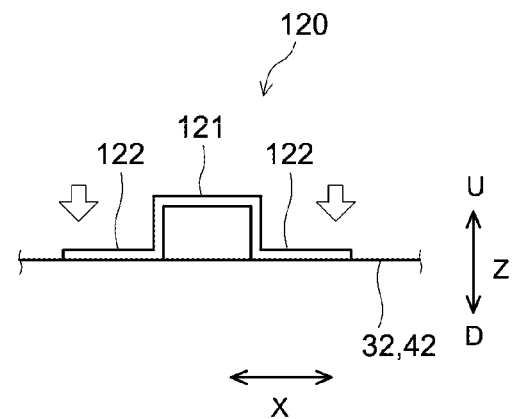
FIG.13A
FIG.13B
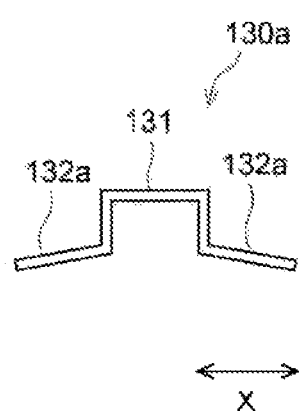
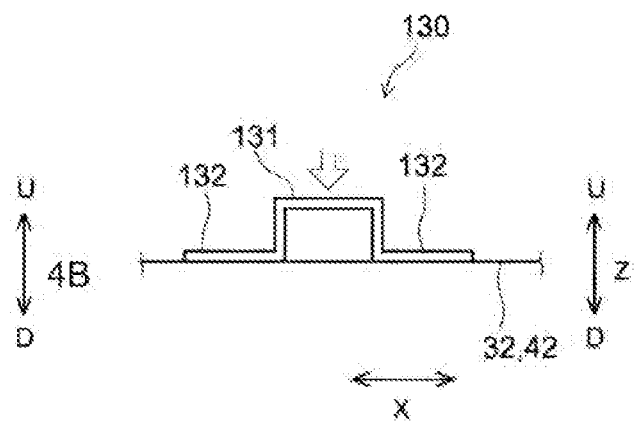
FIG.14A
FIG.14B

SECONDARY BATTERY AND ASSEMBLED BATTERY

CROSS REFERENCE TO RELATED APPLICATIONS

The present application claims priority on the basis of Japanese Patent Application No. 2020-200852 filed in Japan on Dec. 3, 2020, the entire contents of which are incorporated herein by reference.

BACKGROUND OF THE DISCLOSURE

1. Technical Field

The present disclosure relates to a secondary battery and an assembled battery.

2. Description of Background

Assembled batteries constructed by electrically connecting a plurality of secondary batteries to each other are widely used as high-output power supplies for driving vehicles and the like. When an excessive current is supplied to a secondary battery constituting an assembled battery due to an erroneous operation or the like, an inconvenience such as a rise in temperature can occur. Therefore, conventionally, a secondary battery is known which is equipped with a mechanism for cutting off a conduction path when a current equal to or exceeding a predetermined current flows.

For example, Japanese Patent Application Publication No. 2017-157334 discloses a secondary battery including: an electrode body which has a positive electrode and a negative electrode; a battery case which houses the electrode body and which has a terminal extracting hole; a terminal which is connected to the positive electrode or the negative electrode inside the battery case and which is extracted to outside of the battery case from the terminal extracting hole; an external conductive plate which electrically connects the terminal and a busbar to each other outside of the battery case; and a fuse unit which is provided between a terminal connecting portion of the external conductive plate and a busbar connecting portion and which melts when a current equal to or exceeding a predetermined current flows.

SUMMARY

With secondary batteries mounted to, for example, vehicles such as automobiles, progress has been made in realizing higher capacity and higher energy density. In such a secondary battery, there is a need to minimize generation of heat inside the battery and increase reliability when a large current of 1000 A or more flows.

The present disclosure has been made in consideration of the circumstances described above and an object thereof is to provide a highly reliable secondary battery and an assembled battery which are capable of minimizing generation of heat inside a battery when a large current flows.

The present disclosure provides a secondary battery including: one or a plurality of electrode bodies which have a positive electrode and a negative electrode; a battery case which houses the electrode body and which has a terminal extracting hole; a terminal which is electrically connected to the positive electrode or the negative electrode inside the battery case and which is extracted to outside of the battery case from the terminal extracting hole; and an external conductive member which is joined to the terminal outside of the battery case. The external conductive member has a through-hole into which a part of the terminal is inserted. A joining portion between the external conductive member and the terminal is formed on a peripheral edge of the through-hole. The external conductive member has an approximately annular thin portion provided around the joining portion. The thin portion is configured to melt when a current of 1000 A or more flows through the secondary battery.

In the present disclosure, forming the thin portion in an approximately annular shape prevents a cantilevered state to be created and a load on the thin portion to increase during, for example, assembly of the secondary battery and improves mechanical reliability. In addition, in the present disclosure, when a large current flows in the secondary battery, the approximately annular thin portion provided around the joining portion between the terminal and the external conductive member melts and cuts off a conduction path. According to such a novel configuration, generation of heat inside the battery can be preferably suppressed when a large current flows and a comprehensively highly reliable secondary battery can be provided.

In a preferable aspect of the secondary battery disclosed herein, the external conductive member has an approximately annular recessed portion which is provided along an edge of the through-hole and which opposes the terminal, and a space of 3 $mm^3$ or larger is secured between the external conductive member and the terminal. According to such a configuration, thermal conductivity of the external conductive member stabilizes and melting characteristics when a large current flows can be made constant. Therefore, reliability of the secondary battery can be improved.

In a preferable aspect of the secondary battery disclosed herein, there is a region in which the thin portion extends for 0.5 mm or more in a radial direction at a thickness of 0.1 mm or more and 1 mm or less. According to such a configuration, conduction with the terminal can be sufficiently secured during normal use and electrical resistance can be reduced. In addition, a strength and deformation resistance of the external conductive member can be increased. Furthermore, when a large current flows in the secondary battery, the thin portion can be melted in a more stable manner.

In a preferable aspect of the secondary battery disclosed herein, in the thin portion, a thinnest portion is provided at a position separated from the through-hole in the radial direction. According to such a configuration, conduction with the terminal can be sufficiently secured during normal use and electrical resistance can be reduced. In addition, a strength and deformation resistance of the external conductive member can be increased.

In a preferable aspect of the secondary battery disclosed herein, the terminal has: an inserted portion which is inserted into the terminal extracting hole; a flange portion which extends from the inserted portion and which is arranged outside of the battery case; and a projected portion which projects toward an opposite side to the inserted portion from the flange portion and which is inserted into the through-hole, and the external conductive member is arranged on a surface of the flange portion. According to such a configuration, the secondary battery can be more easily controlled to a safe energy state. In other words, after a large current flows through the secondary battery and the thin portion melts, a high-resistance conduction path is formed between the flange portion of the terminal and the external conductive member and the flange portion and the external conductive member can be conductively re-connected to each other. Accordingly, a current can flow along the high-resistance conduction path between the flange portion and the external conductive member and energy stored (remaining) in the secondary battery can be gradually released.

In a preferable aspect of the secondary battery disclosed herein, a contact surface area between the external conductive member and the flange portion is 150 mm$^2$ or more and 250 mm$^2$ or less. According to such a configuration, conduction with the terminal can be sufficiently secured during normal use and electrical resistance can be reduced. In addition, a strength and deformation resistance of the secondary battery can be increased. Furthermore, the flange portion and the external conductive member can be more readily conductively re-connected to each other after the thin portion melts.

In a preferable aspect of the secondary battery disclosed herein, the terminal has: an inserted portion which is inserted into the terminal extracting hole; a flange portion which extends from the inserted portion and which is arranged outside of the battery case; and a projected portion which projects toward an opposite side to the inserted portion from the flange portion and which is inserted into the through-hole, and the external conductive member is arranged on top of the flange portion via an insulating member. According to such a configuration, after a large current flows and the thin portion melts, the flange portion and the external conductive member can be prevented from coming into contact with each other and the conduction path can be cut off.

In a preferable aspect of the secondary battery disclosed herein, the electrode body is provided in plurality, and the secondary battery further includes a positive electrode current collecting unit which is interposed between the terminal and the positive electrode of the plurality of the electrode bodies. The positive electrode current collecting unit has: a positive electrode first current collecting unit which is joined to the terminal; and a plurality of positive electrode second current collecting units which are joined to the positive electrode first current collecting unit and which are electrically connected to each of the positive electrodes of the plurality of the electrode bodies. When a plurality of electrode bodies are provided, heat generated when a large current flows tends to increase. Therefore, the technique disclosed herein can be applied particularly effectively. In addition, according to such a configuration, a volume energy density of the secondary battery can be improved and downsizing of the secondary battery can be realized while ensuring reliability when a large current flows.

In addition, the present disclosure provides an assembled battery including the secondary battery disclosed herein in plurality.

In a preferable aspect of the assembled battery disclosed herein, a busbar which electrically connects a plurality of the secondary batteries to each other is provided, and the busbar is attached to the external conductive member in a state of being biased in a direction away from the battery case. According to such a configuration, after a large current flows and the thin portion melts, the external conductive member moves so as to separate from the terminal. Accordingly, the conduction path between the external conductive member and the terminal can be cut off.

BRIEF DESCRIPTION OF THE DRAWINGS

FIGS. 13A and 13B are side views schematically showing a busbar according to a first modification, in which FIG. 13A indicates an initial state and FIG. 13B indicates a state in an assembled battery;
and
FIGS. 14A and 14B are side views schematically showing a busbar according to a second modification, in which FIG. 14A indicates an initial state and FIG. 14B indicates a state in an assembled battery.

DETAILED DESCRIPTION

Hereinafter, some preferable embodiments of the technique disclosed herein will be described with reference to the drawings. It should be noted that matters required to carry out the present disclosure (for example, a general configuration and a general manufacturing process of secondary batteries which do not characterize the present disclosure) other than those specifically described in the present specification can be comprehended as design matters for a person with ordinary skill in the art on the basis of prior art in the relevant field. The present disclosure can be carried out on the basis of the contents disclosed in the present specification and common general technical knowledge in the relevant field. Furthermore, a notation of "A to B" representing a range in the present specification is to mean "A or more and B or less" but also includes the meanings of "favorably more than A" and "favorably less than B".

In the present specification, a "secondary battery" is a term that refers to repetitively chargeable and dischargeable power storage devices in general and is a concept that encompasses so-called storage batteries (chemical batteries) such as a lithium-ion secondary battery and a nickel hydride battery as well as capacitors (physical batteries) such as an electrical double layer capacitor.

Secondary Battery 100

Figure 1:
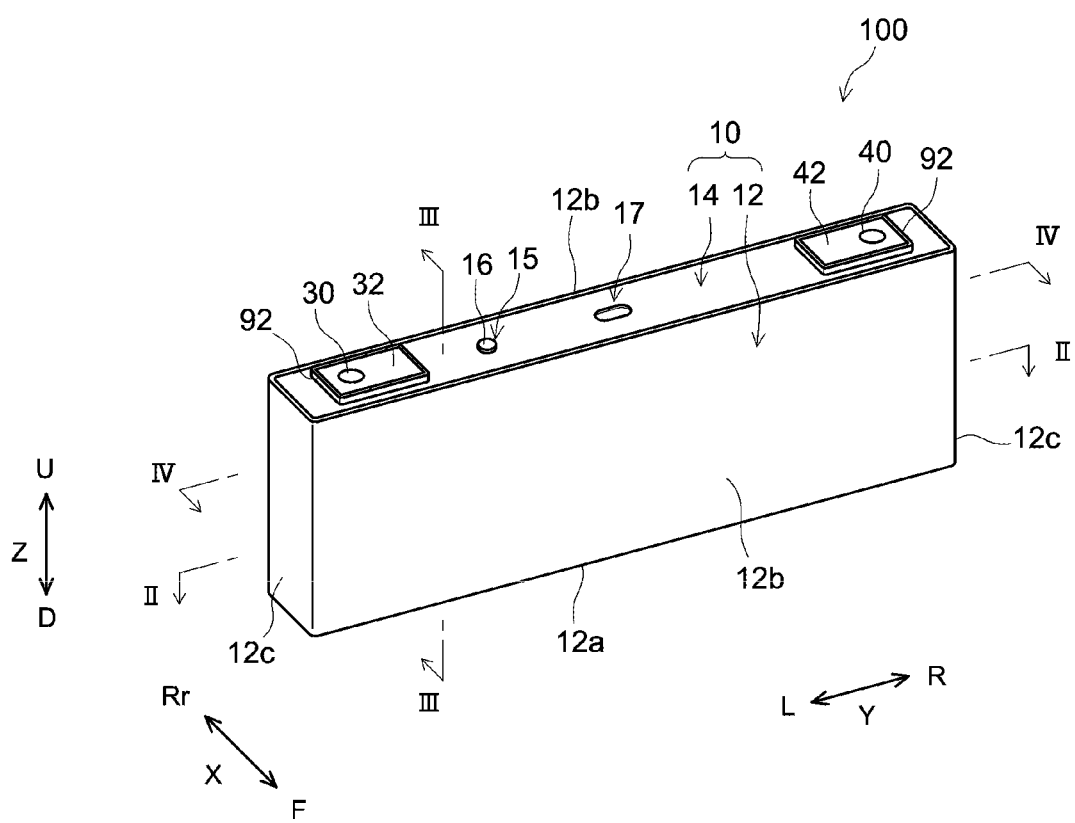
FIG. 1 is a perspective view schematically showing a secondary battery according to an embodiment.
Figure 2:
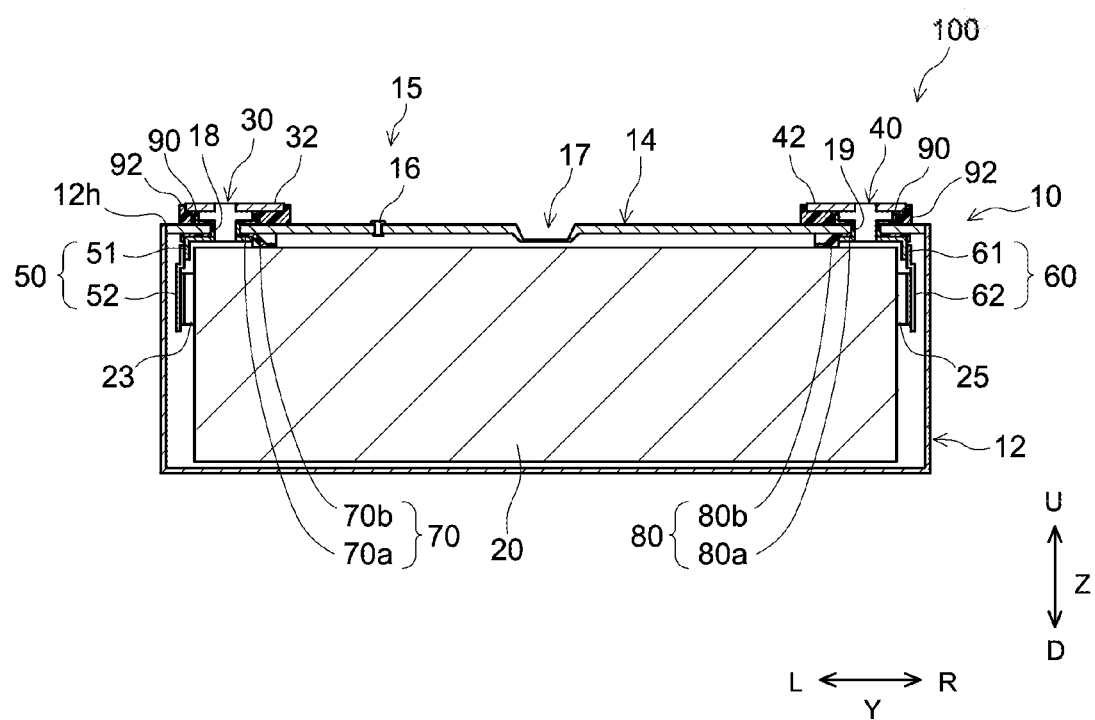
FIG. 2 is a schematic longitudinal sectional view taken along line II-II in FIG. 1.
Figure 3:
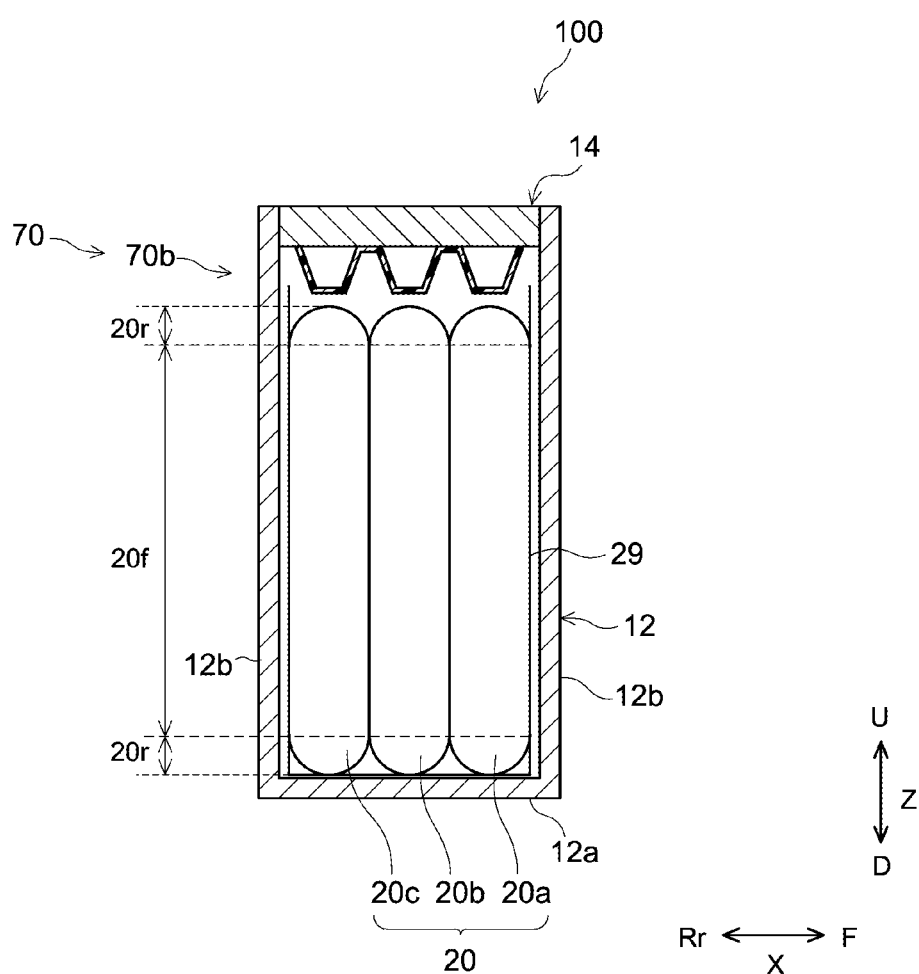
FIG. 3 is a schematic longitudinal sectional view taken along line III-III in FIG. 1.
Figure 4:
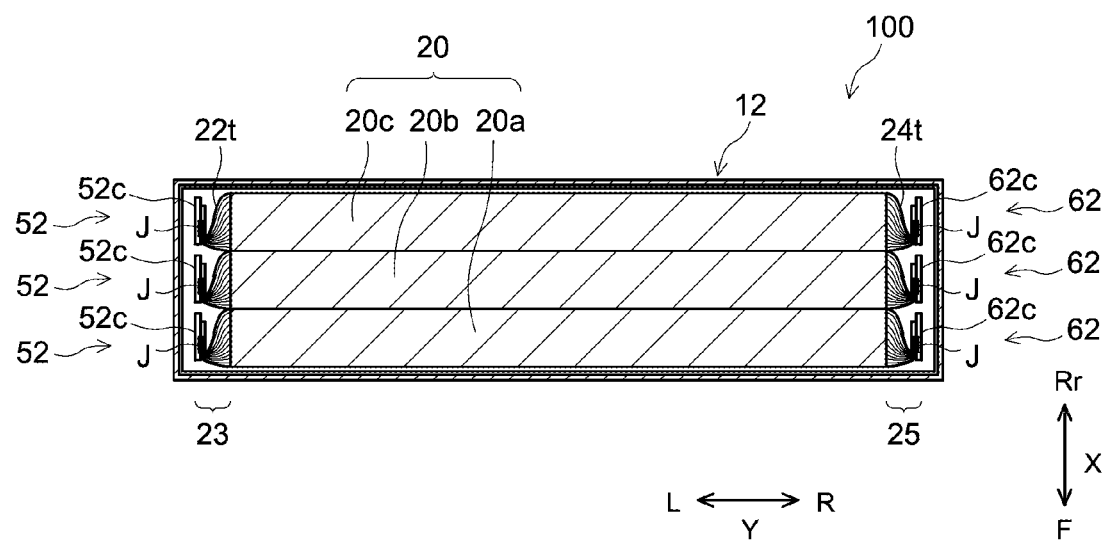
FIG. 4 is a schematic transverse sectional view taken along line IV-IV in FIG. 1.

FIG. 1 is a perspective view of a secondary battery 100. FIG. 2 is a schematic longitudinal sectional view taken along line II-II in FIG. 1. FIG. 3 is a schematic longitudinal sectional view taken along line in FIG. 1. FIG. 4 is a schematic transverse sectional view taken along line IV-IV in FIG. 1. In the following description, it is assumed that reference signs L, R, F, Rr, U, and D in the drawings represent left, right, front, rear, up, and down and reference signs X, Y, and Z in the drawings respectively represent a short-side direction of the secondary battery 100, a long-side direction that is perpendicular to the short-side direction, and an up-down direction. However, these directions are only provided in order to facilitate understanding and are not intended to limit modes of installation of the secondary battery 100 in any way whatsoever.

As shown in FIG. 2, the secondary battery 100 includes a battery case 10, an electrode body group 20, a positive electrode terminal 30, a positive electrode external conductive member 32, a negative electrode terminal 40, a negative electrode external conductive member 42, an external insulating member 92, a positive electrode current collecting unit 50, a negative electrode current collecting unit 60, a positive electrode internal insulating member 70, and a negative electrode internal insulating member 80. Although details will be provided later, the positive electrode current collecting unit 50 includes a positive electrode first current collecting unit 51 and a positive electrode second current collecting unit 52, and the negative electrode current collecting unit 60 includes a negative electrode first current collecting unit 61 and a negative electrode second current collecting unit 62. Although not illustrated, the secondary battery 100 in this case further includes an electrolyte solution. In this case, the secondary battery 100 is a lithium-ion secondary battery. An internal resistance of the secondary battery 100 can be, for example, around 0.2 to 2.0 mΩ.

The battery case 10 is a casing which houses the electrode body group 20. In this case, the battery case 10 has an external shape that is a flat and bottomed rectangular parallelepiped shape (square shape). A material of the battery case 10 may be similar to those conventionally used and is not particularly limited. The battery case 10 is preferably made of a metal and, for example, more preferably made of aluminum, an aluminum alloy, iron, an iron alloy, or the like. As shown in FIG. 2, the battery case 10 preferably includes an outer package 12 having an opening 12h and a sealing plate (lid) 14 which closes the opening 12h.

As shown in FIG. 1, the outer package 12 includes a bottom wall 12a, a pair of long-side walls 12b which extend from the bottom wall 12a and which oppose each other, and a pair of short-side walls 12c which extend from the bottom wall 12a and which oppose each other. The bottom wall 12a has an approximately rectangular shape. An area of the short-side wall 12c is smaller than an area of the long-side wall 12b. The sealing plate 14 is attached to the outer package 12 so as to close the opening 12h of the outer package 12. The sealing plate 14 opposes the bottom wall 12a of the outer package 12. The sealing plate 14 has an approximately rectangular shape in a plan view. The battery case 10 is integrated by joining (for example, weld joining) the sealing plate 14 to a peripheral edge of the opening 12h of the outer package 12. Joining of the sealing plate 14 can be performed by, for example, welding such as laser welding. The battery case 10 is airtightly sealed (hermetically sealed).

As shown in FIG. 2, the sealing plate 14 is provided with an electrolyte injection hole 15, a gas release vent 17, and two terminal extracting holes 18 and 19. The electrolyte injection hole 15 is for injecting an electrolyte solution after the sealing plate 14 is assembled to the outer package 12. The electrolyte injection hole 15 is sealed by a sealing member 16. The gas release vent 17 is configured to break when pressure inside the battery case 10 reaches or exceeds a predetermined value and discharge gas inside the battery case 10 to the outside. The terminal extracting holes 18 and 19 are respectively formed at both ends in the long-side direction Y of the sealing plate 14. The terminal extracting holes 18 and 19 penetrate the sealing plate 14 in the up-down direction Z.

Figure 5:
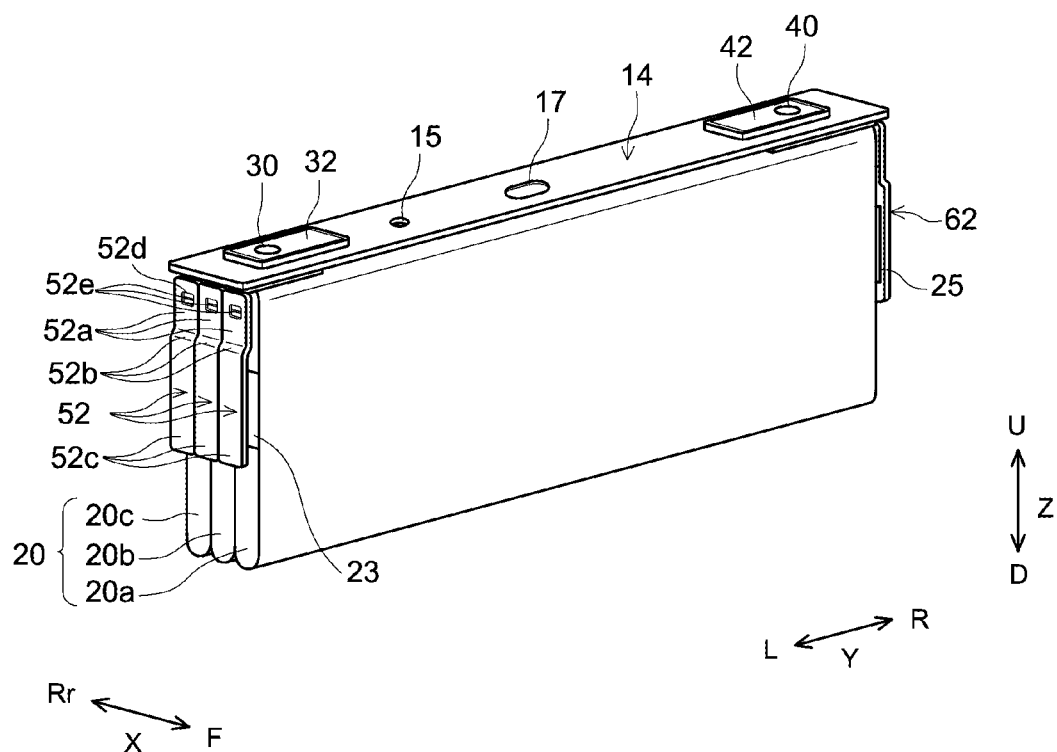
FIG. 5 is a perspective view schematically showing an electrode body group attached to a sealing plate.

FIG. 5 is a perspective view schematically showing the electrode body group 20 attached to the sealing plate 14. In this case, the electrode body group 20 has three electrode bodies 20a, 20b, and 20c. However, the number of electrode bodies arranged inside a single battery case 10 is not particularly limited and there may be one or two or more (a plurality of) electrode bodies. The electrode bodies 20a, 20b, and 20c are connected in parallel by having the positive electrode current collecting unit 50 arranged on one side in the long-side direction Y (a left side in FIG. 5) and the negative electrode current collecting unit 60 arranged on the other side in the long-side direction Y (a right side in FIG. 5). Alternatively, the electrode bodies 20a, 20b, and 20c may be connected in series. The electrode body group 20 is arranged inside the outer package 12 of the battery case 10 in a state of being covered by an electrode body holder 29 (refer to FIG. 3) made of a resin sheet.

Figure 6:
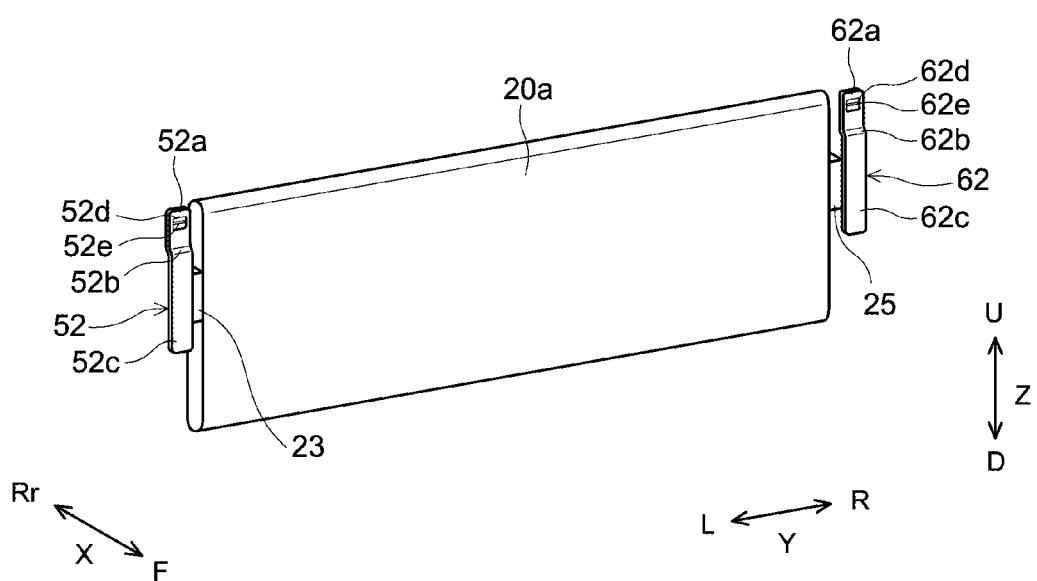
FIG. 6 is a perspective view schematically showing an electrode body to which a positive electrode second current collecting unit and a negative electrode second current collecting unit have been attached.
Figure 7:
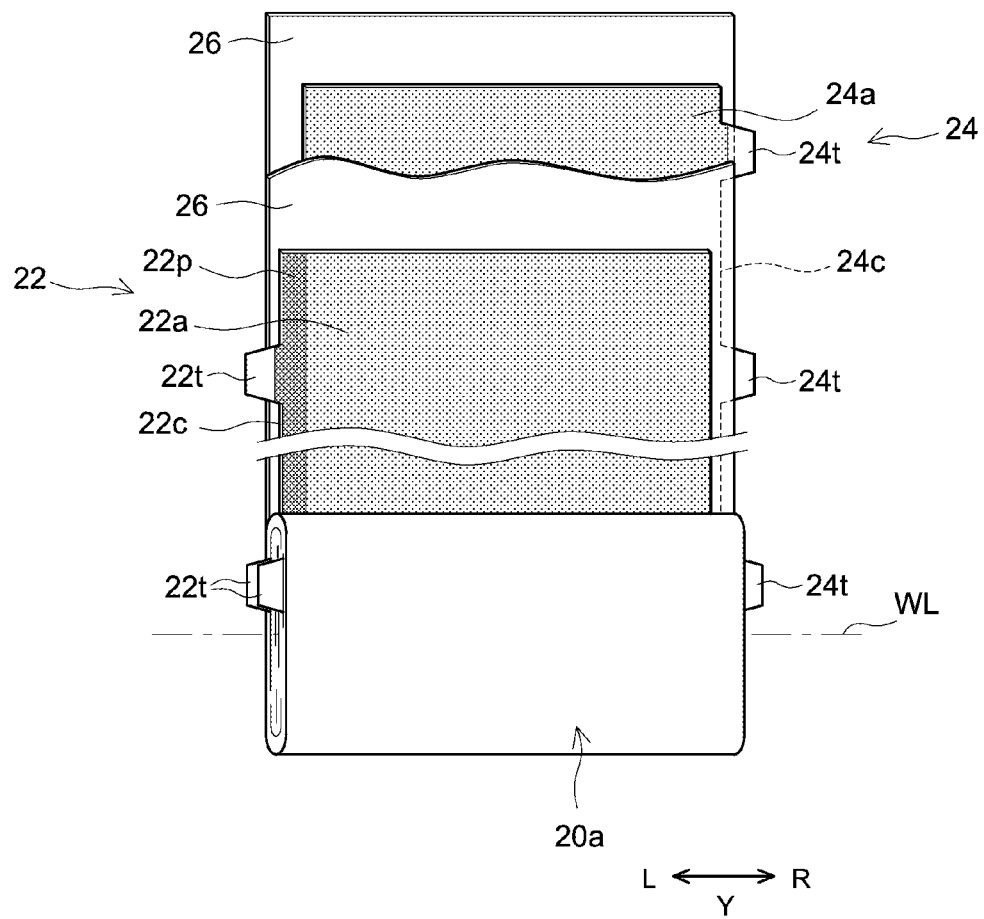
FIG. 7 is a schematic view showing a configuration of an electrode body.

FIG. 6 is a perspective view schematically showing the electrode body 20a. FIG. 7 is a schematic view showing a configuration of the electrode body 20a. While the electrode body 20a will be described in detail below as an example, the electrode bodies 20b and 20c can also be configured in a similar manner.

As shown in FIG. 7, the electrode body 20a has a positive electrode 22, a negative electrode 24, and a separator 26. In this case, the electrode body 20a is a wound electrode body in which the band-shaped positive electrode 22 and the band-shaped negative electrode 24 are laminated via two band-shaped separators 26 and wound around a winding axis WL. The electrode body 20a has a flat shape. The electrode body 20a is arranged inside the outer package 12 in an orientation where the winding axis WL is approximately parallel to the long-side direction Y.

As shown in FIG. 3, the electrode body 20a has a pair of bent portions (R portions) 20r which oppose the bottom wall 12a of the outer package 12 and the sealing plate 14 and a flat portion 20f which connects the pair of bent portions 20r to each other and which opposes the long-side wall 12b of the outer package 12. The flat portion 20f extends along the long-side wall 12b. Alternatively, the electrode body 20a may be a laminated electrode body in which a plurality of square-shaped (typically, rectangular-shaped) positive electrodes and a plurality of square-shaped (typically, rectangular-shaped) negative electrodes are stacked up in an insulated state.

As shown in FIG. 7, the positive electrode 22 has a positive electrode current collector 22c and a positive electrode active material layer 22a and a positive electrode protective layer 22p which are fixed to at least one surface of the positive electrode current collector 22c. However, the positive electrode protective layer 22p is not essential and may be omitted in other embodiments. The positive electrode current collector 22c has a band shape. For example, the positive electrode current collector 22c is made of a conductive metal such as aluminum, an aluminum alloy, nickel, or stainless steel. In this case, the positive electrode current collector 22c is a metal foil or, more specifically, an aluminum foil.

A plurality of positive electrode tabs 22t are provided at one end (a left end in FIG. 7) in the long-side direction Y of the positive electrode current collector 22c. The plurality of positive electrode tabs 22t are provided at intervals (intermittently) along the lengthwise direction of the positive electrode 22. The plurality of positive electrode tabs 22t protrude to one side (a left side in FIG. 7) in the long-side direction Y. The plurality of positive electrode tabs 22t protrude farther in the long-side direction Y than the separator 26. Alternatively, the positive electrode tabs 22t may be provided at the other end (a right end in FIG. 7) in the long-side direction Y or respectively provided at both ends in the long-side direction Y. The positive electrode tabs 22t are a part of the positive electrode current collector 22c and are made of a metal foil (aluminum foil). Alternatively, the positive electrode tabs 22t may be a separate member from the positive electrode current collector 22c. In at least a part of the positive electrode tabs 22t, the positive electrode active material layer 22a and the positive electrode protective layer 22p are not formed and the positive electrode current collector 22c is exposed.

As shown in FIG. 4, the plurality of positive electrode tabs 22t are laminated at one end (a left end in FIG. 4) in the long-side direction Y and constitute a positive electrode tab group 23. The plurality of positive electrode tabs 22t are bent so that outward side ends are aligned with each other. Accordingly, a storage property to the battery case 10 can be improved and the secondary battery 100 can be downsized. The positive electrode tab group 23 is electrically connected to the positive electrode terminal 30 via the positive electrode current collecting unit 50. Preferably, the plurality of positive electrode tabs 22t are bent and electrically connected to the positive electrode terminal 30. A positive electrode second current collecting unit 52 is attached to the positive electrode tab group 23. A size (a length in the long-side direction Y and a width perpendicular to the long-side direction Y: refer to FIG. 7) of the plurality of positive electrode tabs 22t can be appropriately adjusted in accordance with a formation position or the like in consideration of a state of being connected to the positive electrode current collecting unit 50. In this case, the plurality of positive electrode tabs 22t have mutually different sizes so that outward side ends are aligned when bent.

As shown in FIG. 7, the positive electrode active material layer 22a is provided in a band shape along a lengthwise direction of the band-shaped positive electrode current collector 22c. The positive electrode active material layer 22a includes a positive electrode active material (for example, a lithium-transition metal compound oxide such as lithium-nickel-cobalt-manganese compound oxide) which is capable of reversibly storing and releasing a charge carrier. When an entire solid content of the positive electrode active material layer 22a is assumed to be 100% by mass, the positive electrode active material may roughly occupy 80% by mass or more, typically 90% by mass or more and, for example, 95% by mass or more. The positive electrode active material layer 22a may include an arbitrary component other than the positive electrode active material such as a conductive material, a binder, or various additive components. As the conductive material, for example, a carbon material such as acetylene black (AB) can be used. As the binder, for example, polyvinylidene fluoride (PVdF) or the like can be used.

As shown in FIG. 7, the positive electrode protective layer 22p is provided in a boundary portion between the positive electrode current collector 22c and the positive electrode active material layer 22a in the long-side direction Y. In this case, the positive electrode protective layer 22p is provided at one end (the left end in FIG. 7) in the long-side direction Y of the positive electrode current collector 22c. Alternatively, the positive electrode protective layer 22p may be provided at both ends in the long-side direction Y. The positive electrode protective layer 22p is provided in a band shape along the positive electrode active material layer 22a. The positive electrode protective layer 22p includes an inorganic filler (for example, alumina). When an entire solid content of the positive electrode protective layer 22p is assumed to be 100% by mass, the inorganic filler may roughly occupy 50% by mass or more, typically 70% by mass or more and, for example, 80% by mass or more. The positive electrode protective layer 22p may include an arbitrary component other than the inorganic filler such as a conductive material, a binder, or various additive components. The conductive material and the binder may be the same as exemplified as those that can be included in the positive electrode active material layer 22a.

As shown in FIG. 7, the negative electrode 24 has a negative electrode current collector 24c and a negative electrode active material layer 24a which is fixed to at least one surface of the negative electrode current collector 24c. The negative electrode current collector 24c has a band shape. For example, the negative electrode current collector 24c is made of a conductive metal such as copper, a copper alloy, nickel, or stainless steel. In this case, the negative electrode current collector 24c is a metal foil or, more specifically, a copper foil.

A plurality of negative electrode tabs 24t are provided at one end (a right end in FIG. 7) in the long-side direction Y of the negative electrode current collector 24c. The plurality of negative electrode tabs 24t are provided at intervals (intermittently) along the lengthwise direction of the negative electrode 24. The plurality of negative electrode tabs 24t protrude farther in the long-side direction Y than the separator 26. The negative electrode tabs 24t protrude to one side (a right side in FIG. 7) in the long-side direction Y. Alternatively, the negative electrode tabs 24t may be provided at the other end (a left end in FIG. 7) in the long-side direction Y or respectively provided at both ends in the long-side direction Y. The negative electrode tabs 24t are a part of the negative electrode current collector 24c and are made of a metal foil (copper foil). Alternatively, the negative electrode tabs 24t may be a separate member from the negative electrode current collector 24c. In at least a part of the negative electrode tabs 24t, the negative electrode active material layer 24a is not formed and the negative electrode current collector 24c is exposed.

As shown in FIG. 4, the plurality of negative electrode tabs 24t are laminated at one end (a right end in FIG. 4) in the long-side direction Y and constitute a negative electrode tab group 25. The negative electrode tab group 25 is provided at a position that is symmetrical to the positive electrode tab group 23 with respect to the long-side direction Y. The plurality of negative electrode tabs 24t are bent so that outward side ends are aligned with each other. Accordingly, a storage property to the battery case 10 can be improved and the secondary battery 100 can be downsized. The negative electrode tab group 25 is electrically connected to the negative electrode terminal 40 via the negative electrode current collecting unit 60. Preferably, the plurality of negative electrode tabs 24t are bent and electrically connected to the negative electrode terminal 40. A negative electrode second current collecting unit 62 is attached to the negative electrode tab group 25. In this case, in a similar manner to the plurality of positive electrode tabs 22t, the plurality of negative electrode tabs 24t have mutually different sizes so that outward side ends are aligned when bent.

As shown in FIG. 7, the negative electrode active material layer 24a is provided in a band shape along a lengthwise direction of the band-shaped negative electrode current collector 24c. The negative electrode active material layer 24a includes a negative electrode active material (for example, a carbon material such as graphite) which is capable of reversibly storing and releasing a charge carrier. When an entire solid content of the negative electrode active material layer 24a is assumed to be 100% by mass, the negative electrode active material may roughly occupy 80% by mass or more, typically 90% by mass or more and, for example, 95% by mass or more. The negative electrode active material layer 24a may include an arbitrary component other than the negative electrode active material such as a binder, a dispersant, or various additive components. As the binder, for example, rubbers such as styrene butadiene rubber (SBR) can be used. As the dispersant, for example, celluloses such as carboxymethyl cellulose (CMC) can be used.

As shown in FIG. 7, the separator 26 is a member which insulates the positive electrode active material layer 22a of the positive electrode 22 and the negative electrode active material layer 24a of the negative electrode 24 from each other. Preferred examples of the separator 26 include a porous resin sheet made of a polyolefin resin such as polyethylene (PE) or polypropylene (PP). The separator 26 may have a base material portion made of a porous resin sheet and a heat resistance layer (HRL) which is provided on at least one surface of the base material portion and which includes an inorganic filler. As the inorganic filler, for example, alumina, boehmite, aluminum hydroxide, or titania can be used.

The electrolyte solution may be similar to conventional electrolyte solutions and is not particularly limited. For example, the electrolyte solution is a nonaqueous electrolytic solution that contains a nonaqueous solvent and a supporting salt. For example, the nonaqueous solvent includes carbonates such as ethylene carbonate, dimethyl carbonate, and ethyl methyl carbonate. The supporting salt is, for example, a fluorine-containing lithium salt such as $LiPF_6$. Alternatively, the electrolyte solution may have a solid form (a solid electrolyte) to be integrated with the electrode body group 20.

As shown in FIGS. 1 and 2, the positive electrode terminal 30 is arranged at one end (a left end in FIGS. 1 and 2) in the long-side direction Y of the sealing plate 14. The negative electrode terminal 40 is arranged at the other end (a right end in FIGS. 1 and 2) in the long-side direction Y of the sealing plate 14. In this case, the positive electrode terminal 30 and the negative electrode terminal 40 respectively protrude from a same surface of the battery case 10 (specifically, the sealing plate 14). Alternatively, the positive electrode terminal 30 and the negative electrode terminal 40 may respectively protrude from different surfaces of the battery case 10. The positive electrode terminal 30 and the negative electrode terminal 40 are respectively attached to the sealing plate 14. The positive electrode terminal 30 and the negative electrode terminal 40 are favorably fixed to the sealing plate 14. The positive electrode terminal 30 and the negative electrode terminal 40 are examples of the terminal. The terminal is favorably the positive electrode terminal 30.

As shown in FIG. 2, the positive electrode terminal 30 is electrically connected inside the outer package 12 to the positive electrode 22 (refer to FIG. 7) of the electrode body group 20 via the positive electrode current collecting unit 50. The positive electrode terminal 30 is inserted to the terminal extracting hole 18 and extracted to the outside from the inside of the sealing plate 14. The positive electrode terminal 30 is insulated from the sealing plate 14 by the positive electrode internal insulating member 70 and a gasket 90. The positive electrode terminal 30 is preferably made of a metal and, for example, more preferably made of aluminum or an aluminum alloy. A positive electrode external conductive member 32 is fixed on top of the positive electrode terminal 30. The positive electrode terminal 30 is joined to the positive electrode external conductive member 32.

Figure 8:
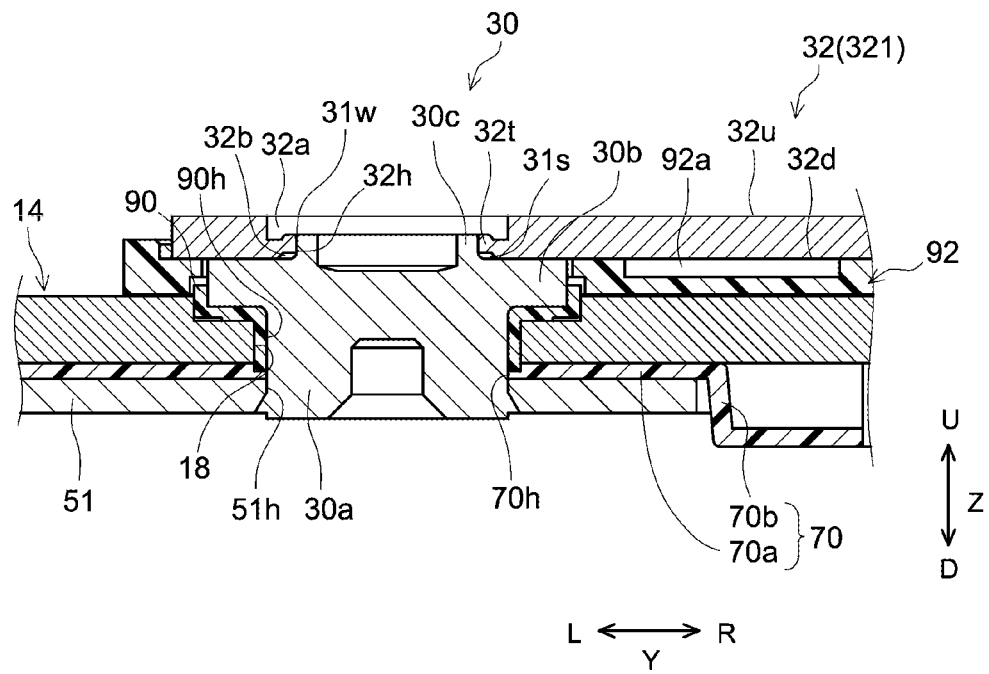
FIG. 8 is a partial enlarged view in which a vicinity of a positive electrode terminal in FIG. 2 has been enlarged.
Figure 9:
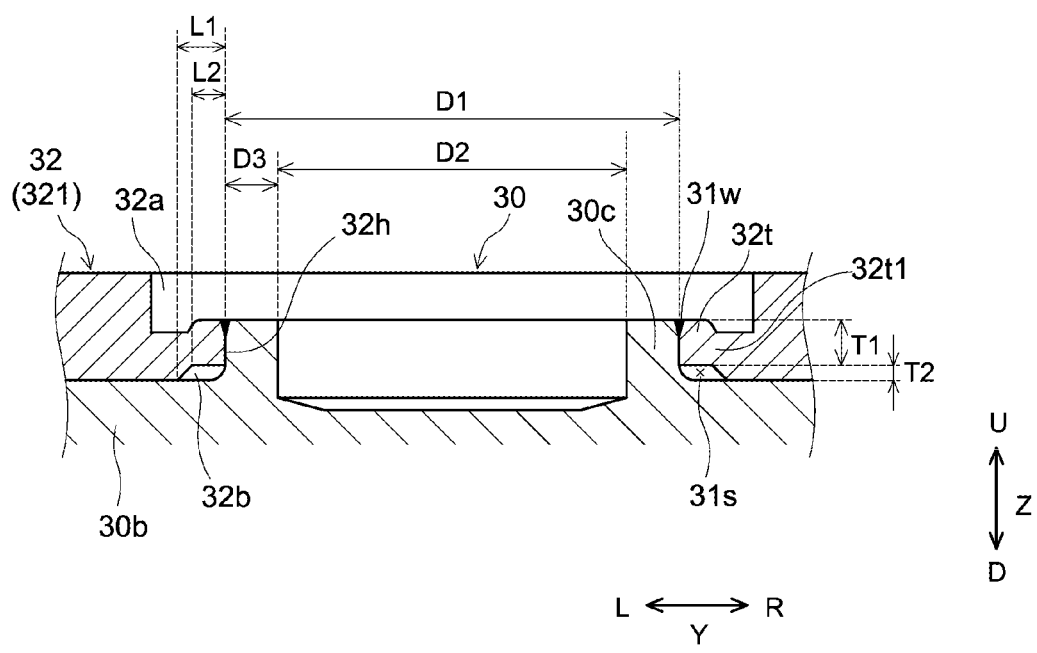
FIG. 9 is a partial enlarged view in which a part of FIG. 8 has been enlarged.

FIG. 8 is a partial enlarged view in which a vicinity of the positive electrode terminal 30 in FIG. 2 has been enlarged. FIG. 9 is a partial enlarged view in which a part of FIG. 8 has been enlarged. As shown in FIG. 8, the positive electrode terminal 30 has an inserted portion 30a, a flange portion 30b, and a projected portion 30c.

The inserted portion 30a is a portion of which an outer diameter is smaller than the terminal extracting hole 18 of the sealing plate 14. The inserted portion 30a penetrates the sealing plate 14 of the battery case 10. Specifically, from a side of the sealing plate 14, the inserted portion 30a is sequentially inserted to a through-hole 90h of the gasket 90, the terminal extracting hole 18 of the sealing plate 14, a through-hole 70h of the positive electrode internal insulating member 70, and a through-hole 51h of the positive electrode first current collecting unit 51. A lower end of the inserted portion 30a is joined to the positive electrode first current collecting unit 51 by, in this case, weld joining. A method of weld joining is not particularly limited and, for example, laser welding, electron beam welding, ultrasonic welding, resistance welding, TIG (Tungsten Inert Gas) welding, or the like may be used. Alternatively, the positive electrode terminal 30 may be joined to the positive electrode first current collecting unit 51 by a method other than weld joining such as swaging, riveting, press fitting, shrink fitting, folding, bolt joining, thermal compression bonding, ultrasonic pressure welding, and brazing.

The flange portion 30b is a portion (an enlarged diameter portion) of which an outer diameter is larger than the terminal extracting hole 18 of the sealing plate 14. The flange portion 30b extends upward from an upper end of the inserted portion 30a. The flange portion 30b protrudes from the terminal extracting hole 18 and is arranged outside of the battery case 10. The flange portion 30b is placed on an upper surface (a surface on a far side from the outer package 12) of the sealing plate 14. The flange portion 30b may be formed in an approximately circular shape or a polygonal shape such as a quadrangular shape in a plan view. The positive electrode external conductive member 32 is arranged above the flange portion 30b. In this case, the flange portion 30b is in direct contact with the positive electrode external conductive member 32.

The projected portion 30c is a portion that projects upward (toward a side opposite to the inserted portion 30a) from an upper end of the flange portion 30b. The projected portion 30c is inserted into the through-hole 32h of the positive electrode external conductive member 32. The projected portion 30c is joined with the positive electrode external conductive member 32. A joining portion 31w with the positive electrode terminal 30 is formed in the projected portion 30c. In this case, the projected portion 30c is formed in an approximately annular shape (favorably, a toric shape) in a plan view. Alternatively, the projected portion 30c may be formed in a columnar shape (a solid shape). Although not particularly limited, as shown in FIG. 9, an outer diameter D1 of the projected portion 30c may be roughly 1 to 10 mm and, for example, 5 to 10 mm (as an example, 7.5 mm). The outer diameter D1 of the projected portion 30c may be smaller than the outer diameter of the inserted portion 30a. An inner diameter D2 of the projected portion 30c may be, for example, 5 to 10 mm (as an example, 5.8 mm). A wire diameter D3 (=(D1−D2)/2) of the projected portion 30c may be, for example, 0.1 to 2 mm (as an example, 0.85 mm).

The positive electrode external conductive member 32 is electrically connected outside the battery case 10 to the positive electrode terminal 30. As shown in FIG. 8, the positive electrode external conductive member 32 is joined to the positive electrode terminal 30 by the joining portion 31w. The positive electrode external conductive member 32 is attached to the sealing plate 14 in a state of being insulated from the sealing plate 14 by an external insulating member 92. Favorably, the positive electrode external conductive member 32 has a plate shape. As shown in FIG. 1, in this case, the positive electrode external conductive member 32 has an approximately rectangular shape that is elongated in the long-side direction Y. The positive electrode external conductive member 32 is preferably made of a metal and, for example, more preferably made of aluminum or an aluminum alloy. The positive electrode external conductive member 32 may have a plating layer coated with a metal such as nickel on a part of or an entire surface. The positive electrode external conductive member 32 is an example of the external conductive member.

Figure 12:
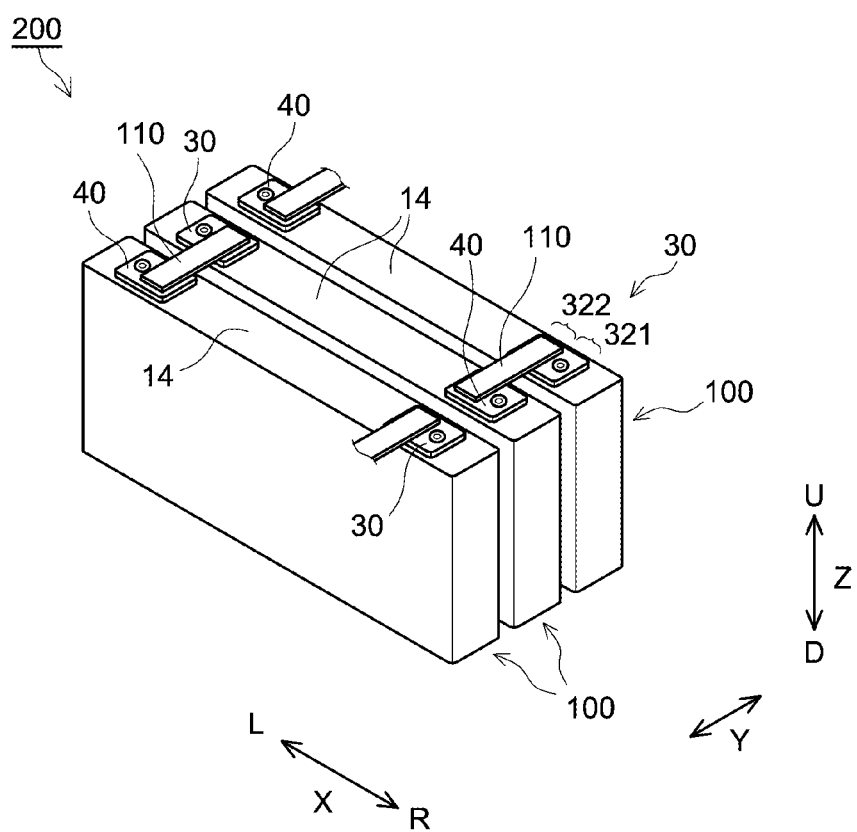
FIG. 12 is a perspective view schematically showing an assembled battery according to an embodiment.

As shown in FIG. 12, the positive electrode external conductive member 32 is a portion divided in the long-side direction Y and has a terminal connection region 321 to be electrically connected to the positive electrode terminal 30 and an extension region 322 which extends to an opposite side to the positive electrode terminal 30 from the terminal connection region 321. The extension region 322 is a portion (a busbar connecting portion) to which a conductive member is attached when fabricating the assembled battery 200 by electrically connecting a plurality of the secondary batteries 100 to each other. In this case, the conductive member is a plate-shaped (rod-shaped) busbar 110. In the secondary battery 100, electrical resistance from the positive electrode tab 22t to the extension region 322 can be, for example, around 0.05 to 0.2 mΩ.

As shown in FIG. 8, the terminal connection region 321 is arranged above the positive electrode terminal 30 or, more specifically, above the flange portion 30b. A contact surface area between an upper surface of the flange portion 30b of the positive electrode terminal 30 and a lower surface of the positive electrode external conductive member 32 is preferably 50 to 500 mm$^2$, more preferably 100 to 300 mm$^2$, and even more preferably 150 to 250 mm$^2$. Accordingly, electrical resistance can be reduced and, at the same time, a strength and deformation resistance can be increased. The terminal connection region 321 is provided with the through-hole 32h, a first recessed portion 32a, a second recessed portion 32b, and a thin portion 32t.

The through-hole 32h penetrates the positive electrode external conductive member 32 in the up-down direction Z. A part of the positive electrode terminal 30 or, in this case, the projected portion 30c is inserted into the through-hole 32h. The through-hole 32h is formed in an approximately circular shape in a plan view. The through-hole 32h may be formed in a same shape as the projected portion 30c. As shown in FIG. 1, the positive electrode terminal 30 (in this case, the projected portion 30c) is exposed from the through-hole 32h on an upper surface of the secondary battery 100. A joining portion 31w between the positive electrode terminal 30 and the positive electrode external conductive member 32 is formed on a peripheral edge (an edge or a periphery) of the through-hole 32h.

The first recessed portion 32a is depressed downward from an upper surface 32u (a surface on a side far from the outer package 12) of the positive electrode external conductive member 32. The first recessed portion 32a is positioned above the thin portion 32t. The first recessed portion 32a is formed in an approximately circular shape that is larger than the through-hole 32h in a plan view. The first recessed portion 32a is provided so as to surround a periphery of the joining portion 31w. Accordingly, the joining portion 31w can be prevented from protruding from the upper surface 32u of the positive electrode external conductive member 32 and the busbar 110 can be more readily connected to the extension region 322.

The second recessed portion 32b is depressed upward from a lower surface 32d (a surface on a side opposing the outer package 12) of the positive electrode external conductive member 32. The second recessed portion 32b is provided along an edge of the through-hole 32h. The second recessed portion 32b is positioned below the thin portion 32t. The second recessed portion 32b opposes the flange portion 30b of the positive electrode terminal 30. The second recessed portion 32b is formed in an approximately annular shape (favorably, a toric shape) in a plan view. In this case, an inner edge of the second recessed portion 32b is formed in a round shape. An outer edge of the second recessed portion 32b is formed in a tapered shape of which a diameter increases toward the lower surface 32d (in other words, the closer to the positive electrode terminal 30). Providing the second recessed portion 32b stabilizes thermal conductivity of the positive electrode external conductive member 32 and makes melting characteristics when a large current flows constant. The second recessed portion 32b is an example of the recessed portion.

A space 31s is secured between the positive electrode terminal 30 and the positive electrode external conductive member 32 or, more specifically, between the upper surface of the flange portion 30b of the positive electrode terminal 30 and the lower surface of the positive electrode external conductive member 32. Accordingly, the contact surface area between the positive electrode terminal 30 and the positive electrode external conductive member 32 described above is adjusted. The space 31s is provided along an edge of the through-hole 32h. The space 31s spreads horizontally along the upper surface of the flange portion 30b. The space 31s is formed in an approximately annular shape (favorably, a toric shape). As shown in FIG. 9, a length T2 in a direction along the through-hole 32h of the space 31s (in other words, a distance of separation between the positive electrode external conductive member 32 and the positive electrode terminal 30) may be roughly 0.1 mm or more and, for example, around 0.1 to 0.5 mm (as an example, 0.25 mm). The distance of separation T2 may be smaller than a thickness T1 of the thin portion 32t. A volume of the space 31s is approximately 3 mm$^3$ or more and may be, for example, around 3 to 10 mm$^3$ (as an example, 5 mm$^3$).

The thin portion 32t is formed along an edge of the through-hole 32h. The thin portion 32t is provided around the joining portion 31w. The thin portion 32t is provided at a peripheral edge of the projected portion 30c of the positive electrode terminal 30. The thin portion 32t is a portion formed thinner than an outside portion in the radial direction. Typically, the thin portion 32t is a portion formed with a smallest cross sectional area among the conduction path from the positive electrode current collecting unit 50 to the positive electrode external conductive member 32. The thin portion 32t is a scheduled melt portion configured to melt when a current (a large current) of 1000 A or more flows through the secondary battery 100. Providing the thin portion 32t enables generation of heat by the secondary battery 100 to be suppressed in a preferable manner. The thin portion 32t is favorably a portion that melts when the positive electrode external conductive member 32 and the negative electrode external conductive member 42 are short-circuited using a conductive member of which resistance is 5 mΩ or lower when a state of charge (SOC) of the secondary battery 100 is 100%. Accordingly, generation of heat in the secondary battery 100 can be more preferably suppressed.

The thin portion 32t is formed in an approximately annular shape (favorably, a toric shape). Accordingly, mechanical reliability can be improved. In addition, conduction can be stably maintained even when an external force such as a vibration or an impact is applied during normal use and strength and deformation resistance can be increased. The thin portion 32t is continuously or intermittently formed. The thin portion 32t may be formed in a dashed line shape or formed divided into a plurality of sections. The thin portion 32t is favorably provided in a region made of aluminum or an aluminum alloy. Since aluminum has a low melting point, when the thin portion 32t is provided in a region mainly made of aluminum, the thin portion 32t more readily melts when a large current flows. A size of the thin portion 32t is favorably adjusted so that a smallest cross sectional area is smaller than a smallest cross sectional area of the positive electrode current collecting unit 50 such as a cross sectional area of the recessed portion 52d and/or the tab joining portion 52c of the positive electrode second current collecting unit 52 to be described later. Accordingly, the thin portion 32t can be melted in a more stable manner when a large current flows.

As shown in FIG. 9, a wire diameter (a maximum length in the radial direction) L1 of the thin portion 32t may be approximately 0.5 mm or more and for example, 0.5 to 5 mm (as an example, 0.85 mm). In the thin portion 32t, at an edge of the through-hole 32h, a region having a predetermined thickness T1 favorably extends over a predetermined length in the radial direction. Accordingly, electrical resistance can be reduced, and at the same time, a strength and deformation resistance can be increased. The thickness T1 is favorably thinner than a thickness of the recessed portion 52d and/or the tab joining portion 52c of the positive electrode second current collecting unit 52. The thickness T1 is favorably approximately 0.1 to 1 mm and, for example, 0.1 to 0.5 mm. A length L2 over which the region with the thickness T1 extends in the radial direction may be approximately 0.5 mm or more and for example, 0.5 to 5 mm (as an example, 0.57 mm).

In the thin portion 32t, a thinnest portion 32t1 is favorably provided at a position separated from the through-hole 32h in the radial direction. Accordingly, electrical resistance can be reduced. The thinnest portion 32t1 is favorably provided at a position separated from the upper surface of the flange portion 30b of the positive electrode terminal 30. Accordingly, a strength and deformation resistance can be increased.

The joining portion 31w is a portion where the positive electrode terminal 30 and the positive electrode external conductive member 32 are joined to each other. The joining portion 31w is formed on a peripheral edge (an edge or a periphery) of the through-hole 32h.

The joining portion 31w is formed in an approximately annular shape (favorably, a toric shape) in a plan view. The joining portion 31w is axisymmetrically formed with respect to an axial center of the positive electrode terminal 30. The joining portion 31w is continuously or intermittently formed. The joining portion 31w may be formed in a dashed line shape.

In this case, the joining portion 31w is a metallurgically metallic joining portion which is formed using optical energy, electronic energy, thermal energy, or the like. The joining portion 31w is, for example, a weld joining portion formed by welding such as laser welding, electron beam welding, ultrasonic welding, resistance welding, or TIG (Tungsten Inert Gas) welding. In particular, welding due to irradiation of a high-energy beam such as a laser is favorable. Alternatively, the joining portion 31w may be formed by a method of metallic joining other than weld joining such as thermal compression bonding, ultrasonic pressure welding, or brazing. In addition, the joining portion 31w may be constituted of a metallic joining portion which continuously or intermittently joins a fastening portion which mechanically fixes the positive electrode terminal 30 and the positive electrode external conductive member 32 to each other and a peripheral edge of the fastening portion. The mechanical fixing may be performed by, for example, swaging, riveting, press fitting, shrink fitting, or folding.

As shown in FIG. 2, the negative electrode terminal 40 is electrically connected inside the outer package 12 to the negative electrode 24 (refer to FIG. 7) of the electrode body group 20 via the negative electrode current collecting unit 60. The negative electrode terminal 40 is inserted to the terminal extracting hole 19 and extracted to the outside from the inside of the sealing plate 14. The negative electrode terminal 40 is insulated from the sealing plate 14 by the negative electrode internal insulating member 80 and the gasket 90. The negative electrode terminal 40 is preferably made of a metal and, for example, more preferably made of copper or a copper alloy. The negative electrode terminal 40 may be constructed by joining and integrating two conductive members with each other. For example, in the negative electrode terminal 40, a portion to be connected to the negative electrode current collecting unit 60 may be made of copper or a copper alloy and a portion that is exposed to an outer side of the sealing plate 14 may be made of aluminum or an aluminum alloy. The negative electrode terminal 40 may be constituted of a clad material of an aluminum-based metal and a copper-based metal. A specific configuration of the negative electrode terminal 40 may be similar to that of the positive electrode terminal 30. A negative electrode external conductive member 42 is fixed on top of the negative electrode terminal 40. The negative electrode terminal 40 is joined to the negative electrode external conductive member 42.

The negative electrode external conductive member 42 is connected outside the battery case 10 to the negative electrode terminal 40. The negative electrode external conductive member 42 is joined to the negative electrode terminal 40. The negative electrode external conductive member 42 is attached to the sealing plate 14 in a state of being insulated from the sealing plate 14 by the external insulating member 92. Favorably, the negative electrode external conductive member 42 has a plate shape. As shown in FIG. 1, in this case, the negative electrode external conductive member 42 has an approximately rectangular shape that is elongated in the long-side direction Y. The negative electrode external conductive member 42 is arranged symmetrical to the positive electrode external conductive member 32 with respect to the long-side direction Y. The negative electrode external conductive member 42 is preferably made of a metal and, for example, more preferably made of aluminum or an aluminum alloy. The negative electrode external conductive member 42 may have a plating layer coated with a metal such as nickel on a part of or an entire surface. A specific configuration of the negative electrode external conductive member 42 may be similar to that of the positive electrode external conductive member 32. The negative electrode external conductive member 42 is an example of the external conductive member.

The external insulating member 92 is a member which insulates, outside of the battery case 10, the positive electrode external conductive member 32 and the negative electrode external conductive member 42 from the sealing plate 14. The external insulating member 92 favorably has an electrical insulation property and heat resistance. For example, the external insulating member 92 is favorably made of a polyolefin-based resin such as polypropylene (PP), a fluorinated resin such as tetrafluoroethylene-perfluoroalkoxy ethylene copolymer (PFA), or a resin such as polyphenylene sulfide (PPS). As shown in FIG. 8, an insulating member recessed portion 92a is provided in a region opposing the extension region 322. Accordingly, heat of the extension region 322 is less readily transmitted to the terminal connection region 321 and melting characteristics when a large current flows can be made constant.

The positive electrode current collecting unit 50 constitutes a conduction path that electrically connects the positive electrode tab group 23 made up of the plurality of positive electrode tabs 22t and the positive electrode terminal 30 to each other. As shown in FIG. 2, in this case, the positive electrode current collecting unit 50 is constituted of the positive electrode first current collecting unit 51 and the positive electrode second current collecting unit 52. The positive electrode first current collecting unit 51 and the positive electrode second current collecting unit 52 may be made of a same metallic species as the positive electrode current collector 22c which is a conductive metal such as aluminum, an aluminum alloy, nickel, or stainless steel.

Figure 10:
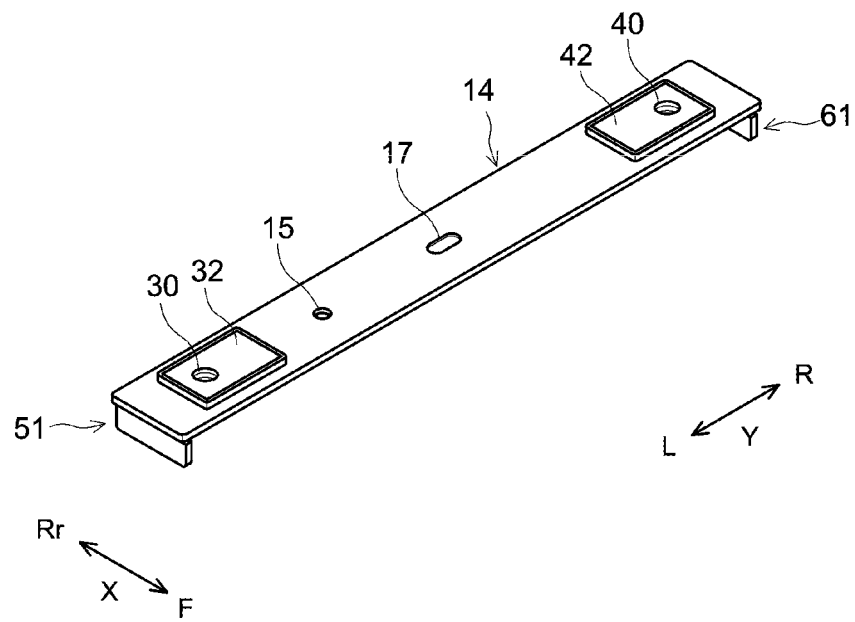
FIG. 10 is a perspective view schematically showing a sealing plate to which a positive electrode terminal, a negative electrode terminal, a positive electrode first current collecting unit, a negative electrode first current collecting unit, a positive electrode internal insulating member, and a negative electrode internal insulating member have been attached.
Figure 11:
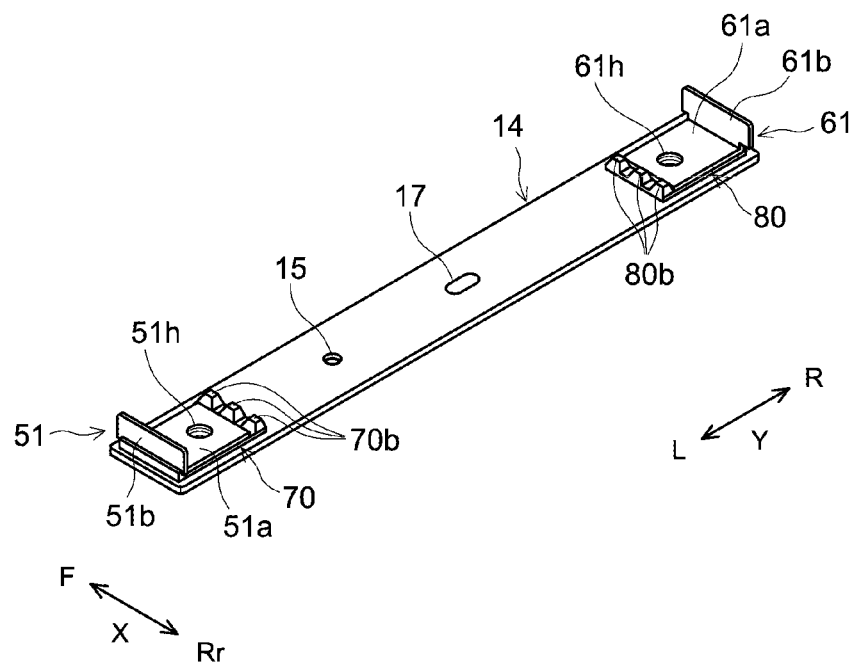
FIG. 11 is a perspective view in which the sealing plate shown in FIG. 10 has been reversed.

FIG. 10 is a perspective view schematically showing the sealing plate 14. FIG. 11 is a perspective view in which the sealing plate shown in FIG. 10 has been reversed. FIG. 11 shows a surface on a side (inside) of the outer package 12 of the sealing plate 14. As shown in FIGS. 10 and 11, the positive electrode first current collecting unit 51 is attached to the surface on the inside of the sealing plate 14. The positive electrode first current collecting unit 51 is electrically connected to the positive electrode terminal 30. The positive electrode first current collecting unit 51 has a first region 51a and a second region 51b. The positive electrode first current collecting unit 51 may be constructed by bending a single member by pressing or the like or by integrating a plurality of members by weld joining or the like.

The first region 51a is a portion that is arranged between the sealing plate 14 and the electrode body group 20. The first region 51a extends along the long-side direction Y. The first region 51a spreads horizontally along the surface on the inside of the sealing plate 14. The positive electrode internal insulating member 70 is arranged between the sealing plate 14 and the first region 51a. The first region 51a is insulated from the sealing plate 14 by the positive electrode internal insulating member 70. A joining portion with the positive electrode terminal 30 is formed in the first region 51a. The joining portion is, for example, a weld joining portion formed by welding such as ultrasonic welding, resistance welding, or laser welding. A smallest cross sectional area of the first region 51a in a periphery of the joining portion is favorably larger than a smallest cross sectional area of the thin portion 32t of the positive electrode external conductive member 32. In the first region 51a, a through-hole 51h that penetrates in the up-down direction Z is formed at a position corresponding to the terminal extracting hole 18 of the sealing plate 14.

The second region 51b is a portion that is arranged between the short-side wall 12c of the outer package 12 and the electrode body group 20. As shown in FIG. 2, the second region 51b extends from one end (a left end in FIG. 2) in the long-side direction Y of the first region 51a toward the short-side wall 12c of the outer package 12. The second region 51b extends along the up-down direction Z. The second region 51b is joined with the positive electrode second current collecting unit 52.

As shown in FIG. 2, the positive electrode second current collecting unit 52 extends along the short-side wall 12c of the outer package 12. As shown in FIGS. 5 and 6, the positive electrode second current collecting unit 52 has a current collector plate connecting portion 52a, an inclined portion 52b, and a tab joining portion 52c.

The current collector plate connecting portion 52a is a portion to be electrically connected to the positive electrode first current collecting unit 51. The current collector plate connecting portion 52a extends along the up-down direction Z. The current collector plate connecting portion 52a is arranged approximately perpendicular to the winding axis WL of the electrode bodies 20a, 20b, and 20c. The current collector plate connecting portion 52a is provided with a recessed portion 52d of which a thickness is thinner than its surroundings. The recessed portion 52d is provided with a through-hole 52e that penetrates in the short-side direction X. A joining portion with the positive electrode first current collecting unit 51 is formed in the through-hole 52e. The joining portion is, for example, a weld joining portion formed by welding such as ultrasonic welding, resistance welding, or laser welding. In particular, welding due to irradiation of a high-energy beam such as a laser is favorably used. In the electrode body group 20, a smallest cross sectional area of the through-hole 52e in a periphery of the joining portion is favorably larger than a smallest cross sectional area of the thin portion 32t of the positive electrode external conductive member 32.

The tab joining portion 52c is a portion which is attached to the positive electrode tab group 23 and which is to be electrically connected to the plurality of positive electrode tabs 22t. The tab joining portion 52c extends along the up-down direction Z. The tab joining portion 52c is arranged approximately perpendicular to the winding axis WL of the electrode bodies 20a, 20b, and 20c. A surface to be connected to the plurality of positive electrode tabs 22t of the tab joining portion 52c is arranged approximately parallel to the short-side wall 12c of the outer package 12.

As shown in FIG. 4, a joining portion J with the positive electrode tab group 23 is formed in the tab joining portion 52c. The joining portion J is, for example, a weld joining portion formed by welding such as ultrasonic welding, resistance welding, or laser welding in a state where the plurality of positive electrode tabs 22t are stacked. In the joining portion J, the plurality of positive electrode tabs 22t are arranged on one side in the short-side direction X of the electrode bodies 20a, 20b, and 20c. Accordingly, the plurality of positive electrode tabs 22t can be more preferably bent and the positive electrode tab group 23 with a bent shape as shown in FIG. 4 can be formed in a stable manner. In the electrode body group 20, a smallest cross sectional area in a periphery of the joining portion J is favorably larger than a smallest cross sectional area of the thin portion 32t of the positive electrode external conductive member 32. The smallest cross sectional area in the periphery of the joining portion J may be larger than a smallest cross sectional area of the through-hole 52e in in the periphery of the joining portion.

The inclined portion 52b is a portion which couples a lower end of the current collector plate connecting portion 52a and an upper end of the tab joining portion 52c. The inclined portion 52b is inclined with respect to the current collector plate connecting portion 52a and the tab joining portion 52c. The inclined portion 52b couples the current collector plate connecting portion 52a and the tab joining portion 52c to each other so that the current collector plate connecting portion 52a is positioned closer to a center side than the tab joining portion 52c in the long-side direction Y. Accordingly, a housing space of the electrode body group 20 can be widened and high energy density of the secondary battery 100 can be achieved. A lower end of the inclined portion 52b (in other words, an end on the side of the bottom wall 12a of the outer package 12) is favorably positioned lower than a lower end of the positive electrode tab group 23. Accordingly, the plurality of positive electrode tabs 22t can be more preferably bent and the positive electrode tab group 23 with a bent shape as shown in FIG. 4 can be formed in a stable manner.

The negative electrode current collecting unit 60 constitutes a conduction path that electrically connects the negative electrode tab group 25 made up of the plurality of negative electrode tabs 24t and the negative electrode terminal 40 to each other. As shown in FIG. 2, in this case, the negative electrode current collecting unit 60 is constituted of the negative electrode first current collecting unit 61 and the negative electrode second current collecting unit 62. The negative electrode first current collecting unit 61 and the negative electrode second current collecting unit 62 may be made of a same metallic species as the negative electrode current collector 24c which is a conductive metal such as copper, a copper alloy, nickel, or stainless steel. A specific configuration of the negative electrode first current collecting unit 61 and the negative electrode second current collecting unit 62 may be similar to that of the positive electrode first current collecting unit 51 and the positive electrode second current collecting unit 52 of the positive electrode current collecting unit 50.

As shown in FIG. 11, the negative electrode first current collecting unit 61 has a first region 61a and a second region 61b. The negative electrode internal insulating member 80 is arranged between the sealing plate 14 and the first region 61a. The first region 61a is insulated from the sealing plate 14 by the negative electrode internal insulating member 80. In the first region 61a, a through-hole 61h that penetrates in the up-down direction Z is formed at a position corresponding to the terminal extracting hole 19 of the sealing plate 14. As shown in FIG. 6, the negative electrode second current collecting unit 62 has a current collector plate connecting portion 62a to be electrically connected to the negative electrode first current collecting unit 61, an inclined portion 62b, and a tab joining portion 62c which is attached to the negative electrode tab group 25 and which is to be electrically connected to the plurality of negative electrode tabs 24t. The current collector plate connecting portion 62a has a recessed portion 62d to be coupled to the tab joining portion 62c. The recessed portion 62d is provided with a through-hole 62e that penetrates in the short-side direction X.

The positive electrode internal insulating member 70 is a member which insulates the sealing plate 14 and the positive electrode first current collecting unit 51 from each other inside the battery case 10. For example, the positive electrode internal insulating member 70 is made of a resin material which has resistance with respect to an electrolyte solution to be used and an electrical insulating property and which is capable of elastic deformation. The positive electrode internal insulating member 70 is favorably made of a polyolefin-based resin such as polypropylene (PP), a fluorinated resin such as tetrafluoroethylene-perfluoroalkoxy ethylene copolymer (PFA), or polyphenylene sulfide (PPS). As shown in FIG. 2, the positive electrode internal insulating member 70 has a base portion 70a and a plurality of protruding portions 70b. In this case, the base portion 70a and the protruding portions 70b are integrally molded.

The base portion 70a is a portion which is arranged between the sealing plate 14 and the first region 51a of the positive electrode first current collecting unit 51 in the up-down direction Z. The base portion 70a spreads horizontally along the first region 51a of the positive electrode first current collecting unit 51. As shown in FIG. 8, the base portion 70a has a through-hole 70h that penetrates in the up-down direction Z. The through-hole 70h is formed at a position corresponding to the terminal extracting hole 18 of the sealing plate 14.

Each of the plurality of protruding portions 70b protrudes to a side of the electrode body group 20 than the base portion 70a. As shown in FIG. 11, in the long-side direction Y, the plurality of protruding portions 70b are provided on a side of the center of the sealing plate 14 (a right side in FIG. 11) than the base portion 70a. The plurality of protruding portions 70b are arranged side by side in the short-side direction X. As shown in FIG. 3, in this case, the plurality of protruding portions 70b oppose the bent portion 20r of the electrode bodies 20a, 20b, and 20c which constitute the electrode body group 20. In this case, the number of the protruding portions 70b is the same as the number of the electrode bodies 20a, 20b, and 20c which constitute the electrode body group 20. In other words, there are three protruding portions 70b. However, the number of the protruding portions 70b may differ from the number of electrode bodies that constitute the electrode body group 20 and, for example, there may be one protruding portion 70b.

As shown in FIG. 2, the negative electrode internal insulating member 80 is arranged symmetrical to the positive electrode internal insulating member 70 with respect to the long-side direction Y of the electrode body group 20. A specific configuration of the negative electrode internal insulating member 80 may be similar to that of the positive electrode internal insulating member 70. In this case, the negative electrode internal insulating member 80 has a base portion 80a arranged between the sealing plate 14 and the negative electrode first current collecting unit 61 and a plurality of protruding portions 80b in a similar manner to the positive electrode internal insulating member 70.

In the secondary battery 100, when a current (a large current) of 1000 A or more flows, the approximately annular thin portion 32t of the positive electrode external conductive member 32 melts. Accordingly, the conductive path between the positive electrode terminal 30 and the positive electrode external conductive member 32 is cut off. In this case, the conductive path between the positive electrode terminal 30 and the positive electrode external conductive member 32 melts sooner than the positive electrode current collecting unit 50.

In addition, in the present embodiment, since the flange portion 30b of the positive electrode terminal 30 and the positive electrode external conductive member 32 are in contact with each other, after the thin portion 32t melts, a high-resistance conductive path is formed by, for example, contact connection between the flange portion 30b and the positive electrode external conductive member 32. Accordingly, the flange portion 30b and the positive electrode external conductive member 32 can be conductively re-connected to each other. The flange portion 30b and the positive electrode external conductive member 32 are favorably welded by, for example, resistance welding after a large current flows. Conductively re-connecting the flange portion 30b and the positive electrode external conductive member 32 to each other enables a current to flow along the high-resistance conduction path and energy stored (remaining) in the secondary battery 100 to be gradually released. For example, when the secondary battery 100 is mounted to a vehicle such as an automobile, the vehicle can be stopped after securing minimal power during travel.

While the secondary battery 100 can be used in various applications, for example, the secondary battery 100 can be preferably used as a power supply (drive power supply) for a motor mounted to a vehicle such as a passenger vehicle or a truck. While a type of the vehicle is not particularly limited, examples thereof include a plug-in hybrid electric vehicle (PHEV), a hybrid electric vehicle (HEV), and a battery electric vehicle (BEV).

As shown in FIG. 12, the secondary battery 100 can be preferably used to construct an assembled battery 200. In FIG. 12, a plurality of the secondary batteries 100 are electrically connected by bridging the positive electrode external conductive member 32 and the negative electrode external conductive member 42 with the plate-shaped (rod-shaped) busbar 110. For example, the busbar 110 is made of a conductive metal such as aluminum, an aluminum alloy, nickel, or stainless steel. In this case, the busbar 110 has an approximately rectangular shape that is elongated in the short-side direction X. The positive electrode external conductive member 32 and/or the negative electrode external conductive member 42 and the busbar 110 can be electrically connected by, for example, weld joining such as laser welding. Alternatively, electrical connection between the plurality of secondary batteries 100 can be performed by bolt joining or the like.

While several embodiments of the present disclosure have been described above, the embodiments are merely examples. The present disclosure can be implemented in various other modes. The present disclosure can be carried out on the basis of the contents disclosed in the present specification and common general technical knowledge in the relevant field. Techniques described in the scope of claims include various modifications and changes made to the embodiments illustrated above. For example, a part of the embodiments described above may be replaced with another modification or another modification may be added to the embodiments described above. In addition, any technical feature not described as being essential can be deleted when appropriate.

For example, in the embodiment shown in FIGS. 8 and 9 described above, the positive electrode external conductive member 32 is arranged on a surface of the flange portion 30b of the positive electrode terminal 30 and the flange portion 30b and the positive electrode external conductive member 32 are in direct contact with each other. However, embodiments are not limited thereto. The flange portion 30b and the positive electrode external conductive member 32 need not be in contact with each other. For example, the positive electrode external conductive member 32 may be arranged on the flange portion 30b via an insulating member. Accordingly, after a large current flows and the thin portion 321 melts, the flange portion 30b and the positive electrode external conductive member 32 can be prevented from coming into contact with each other and the conduction path can be cut off without conductively re-connecting the flange portion 30b and the positive electrode external conductive member 32 to each other. As the insulating member, for example, a resin sheet or tape such as that constituting the external insulating member 92 can be used. More favorably, the insulating member is made of a material of which a melting point is 200° C. or higher. For example, the insulating member may be made of ceramics.

In addition, for example, in the embodiment shown in FIG. 12 described above, the busbar 110 has a plate shape (a rod shape). However, embodiments are not limited thereto. FIGS. 13A and 13B are side views schematically showing busbars 120a and 120 according to a first modification. As shown in FIG. 13B, in a state of an assembled battery, the busbar 120 according to the first modification has a protruded portion 121 which is separated from the positive electrode external conductive member 32 and/or the negative electrode external conductive member 42 (hereinafter, referred to as the external conductive member 32 or 42) and a planar portion 122 which is in contact with the external conductive member 32 or 42. The busbar 120 is attached to the external conductive member 32 or 42 in a state of being biased in a direction away from the battery case 10.

In other words, as shown in FIG. 13A, the busbar 120a (in an initial state) before being attached to the external conductive member 32 or 42 has the protruded portion 121 and a pair of inclined portions 122a respectively provided at both ends in the short-side direction X of the protruded portion 121. The inclined portion 122a is a portion to become the planar portion 122 that comes into contact with the external conductive member 32 or 42. The inclined portion 122a is inclined downward toward the protruded portion 121. The protruded portion 121 and the inclined portion 122a are at different positions in the up-down direction Z and are not on a same plane. When attaching the busbar 120 to the external conductive member 32 or 42, as indicated by an arrow in FIG. 13B, both ends of the inclined portion 122a are pressed against the external conductive member 32 or 42. Accordingly, the inclined portion 122a deforms and becomes the planar portion 122 that comes into contact with the external conductive member 32 or 42. Due to such a configuration, the busbar 120 is constantly subjected to an upward stress in a state of an assembled battery. As a result, when a large current flows and the thin portion 32t melts, the external conductive member 32 or 42 moves away from the positive electrode terminal 30 or the negative electrode terminal 40. Accordingly, the conductive path between the positive electrode terminal 30 or the negative electrode terminal 40 and the external conductive member 32 or 42 can be cut off in a reliable manner.

In addition, FIGS. 14A and 14B are side views schematically showing busbars 130a and 130 according to a second modification. As shown in FIG. 14B, in a state of an assembled battery, the busbar 130 according to the second modification has a protruded portion 131 which is separated from the external conductive member 32 or 42 and a planar portion 132 which is in contact with the external conductive member 32 or 42. The busbar 130 is attached to the external conductive member 32 or 42 in a state of being biased in a direction approaching the battery case 10.

In other words, as shown in FIG. 14A, the busbar 130a (in an initial state) before being attached to the external conductive member 32 or 42 has the protruded portion 131 and a pair of inclined portions 132a respectively provided at both ends in the short-side direction X of the protruded portion 131. The inclined portion 132a is a portion to become the planar portion 132 that comes into contact with the external conductive member 32 or 42. The inclined portion 132a is inclined upward toward the protruded portion 131 in contrast to the inclined portion 122a of the busbar 120. The protruded portion 131 and the inclined portion 132a are at different positions in the up-down direction Z and are not on a same plane. When attaching the busbar 130 to the external conductive member 32 or 42, as indicated by an arrow in FIG. 14B, the protruded portion 131 is pressed against the external conductive member 32 or 42. Accordingly, the inclined portion 132a deforms and becomes the planar portion 132 that comes into contact with the external conductive member 32 or 42. Due to such a configuration, the busbar 130 is constantly subjected to a downward stress in a state of an assembled battery. As a result, even when a large current flows and the thin portion 32t melts, the contact between the positive electrode terminal 30 or the negative electrode terminal 40 and the external conductive member 32 or 42 is maintained. Accordingly, energy stored (remaining) in the secondary battery 100 can be gradually released. Therefore, the secondary battery 100 can be more easily controlled to a safe energy state.

What is claimed is:

1. A secondary battery, comprising:
   an electrode body comprising a positive electrode and a negative electrode;
   a battery case which houses the electrode body and which has a terminal extracting hole;
   a terminal which is electrically connected to the positive electrode or the negative electrode inside the battery case and which is extracted to outside of the battery case from the terminal extracting hole; and
   an external conductive member which is joined to the terminal outside of the battery case, wherein the external conductive member comprises:
     a first recessed portion extending into the external conductive member from an upper surface of the external conductive member,
     a second recessed portion extending into the external conductive member from a lower surface of the external conductive member,
     a through-hole having a central axis and extending through the external conductive member, the through-hole extending from a radially inner edge of the first recessed portion to a radially inner edge of the second recessed portion and into which a part of the terminal is inserted, and
     an annular protruded portion disposed between the first recessed portion and the second recessed portion and extending radially outwardly from an inner diameter wall surface of the through-hole, wherein
       the second recessed portion of the external conductive member forms an inner chamfered edge of the through-hole facing the part of the terminal,
       a weld joining portion between the external conductive member and the terminal is formed by welding between a radially inner peripheral edge of the annular protruded portion and a radially outer peripheral edge of an end of the part of the terminal inserted into the through-hole, wherein the weld joining portion is located closer to the central axis of the through-hole in a radial direction than an outer peripheral edge of the second recessed portion,
       the annular protruded portion is configured to melt when a current of 1000 A or more flows through the secondary battery, and
       a thinnest portion of the annular protruded portion as measured in a direction parallel to the central axis of the through-hole is provided at a position separated from the through-hole in a radial direction.

2. The secondary battery according to claim 1, wherein a space of 3 mm$^3$ or larger is defined by the second recessed portion, and the space is between the annular protruded portion and the terminal.

3. The secondary battery according to claim 1, wherein a region of the annular protruded portion extends for 0.5 mm or more in the radial direction at a thickness of 0.1 mm or more and 1 mm or less.

4. The secondary battery according to claim 1, wherein the terminal comprises:
   an inserted portion which is inserted into the terminal extracting hole; and
   a flange portion extending from the inserted portion and disposed outside of the battery case,
   the part of the terminal inserted into the through-hole projects from an opposite side of the flange portion to the inserted portion, and
   the external conductive member is disposed on a surface of the flange portion.

5. The secondary battery according to claim 4, wherein a contact surface area between the external conductive member and the flange portion is 150 mm$^2$ or more and 250 mm$^2$ or less.

6. The secondary battery according to claim 1, wherein the electrode body is provided in plurality, and
   the secondary battery further comprises a positive electrode current collecting unit which is interposed between the terminal and the positive electrode of the plurality of the electrode bodies, and
   the positive electrode current collecting unit has:
     a positive electrode first current collecting unit which is joined to the terminal; and
     a plurality of positive electrode second current collecting units which are joined to the positive electrode first current collecting unit and which are electrically connected to each of the positive electrodes of the plurality of the electrode bodies.

7. An assembled battery comprising, in plurality, the secondary battery according to claim 1.

8. The assembled battery according to claim 7, wherein a busbar which electrically connects the plurality of secondary batteries to each other is provided, and
   the busbar is attached to the external conductive member in a state of being biased in a direction away from the battery case.

9. The secondary battery according to claim 1, wherein the second recessed portion defines an annular space between the annular protruded portion and the terminal.

10. The secondary battery according to claim 9, wherein a volume of the annular space is 3 mm$^3$ or larger and 10 mm$^3$ or smaller.

11. A secondary battery, comprising:
    an electrode body comprising a positive electrode and a negative electrode;
    a battery case housing the electrode body and including a terminal extracting hole therethrough;
    a terminal electrically connected to the positive electrode or the negative electrode inside the battery case and extending through the terminal extracting hole to outside of the battery case; and an external conductive member joined to the terminal outside of the battery case, wherein the external conductive member comprises:
- a first recessed portion extending into the external conductive member from an upper surface of the external conductive member,
- a second recessed portion extending into the external conductive member from a lower surface of the external conductive member,
- a through-hole having a central axis and extending through the external conductive member, the through-hole extending from a radially inner edge of the first recessed portion to a radially inner edge of the second recessed portion and into which a part of the terminal is inserted, and
- an annular protruded portion disposed between the first recessed portion and the second recessed portion and extending radially outwardly from an inner diameter wall surface of the through-hole, wherein an annular space of 3 $mm^3$ or larger is defined between the annular protruded portion and the terminal, a weld joining portion between the external conductive member and the terminal is formed by welding between a radially inner peripheral edge of the annular protruded portion and a radially outer peripheral edge of an end of the part of the terminal inserted into the through-hole, wherein the weld joining portion is located closer to the central axis of the through-hole in a radial direction than an outer peripheral edge of the second recessed portion, the annular protruded portion is configured to melt when a current of 1000 A or more flows through the secondary battery, and a thinnest portion of the annular protruded portion as measured in a direction parallel to the central axis of the through-hole is provided at a position separated from the through-hole in a radial direction.

\* \* \* \* \*